United States Patent Office 2,933,127
Patented Apr. 19, 1960

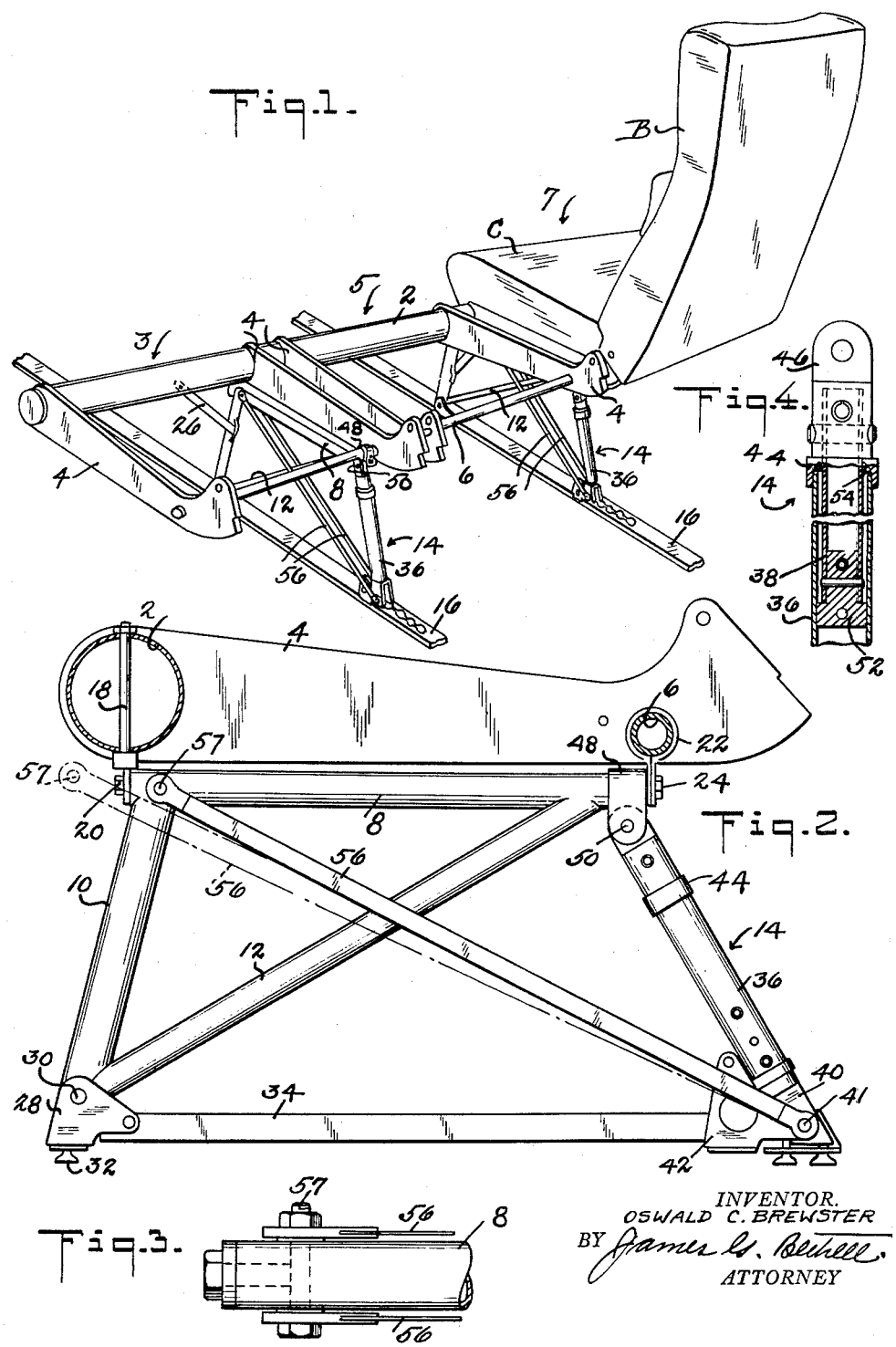

2,933,127
SEATS FOR CONVEYANCES

Oswald C. Brewster, Litchfield, Conn., assignor to Aerotec Industries, Inc.

Application April 11, 1958, Serial No. 727,930

7 Claims. (Cl. 155—9)

This invention relates to an improvement in energy absorbers and, considered in its broadest sense, provides means for yieldingly opposing relative movement between two elements.

While my invention is usable in many fields, I shall describe it as applied to seats for aircraft and other conveyances. It is to be understood, however, that this is for clarity of description and not by way of limitation.

In connection with seat installations, the invention provides that the seat shall be pivoted to the floor, front and rear, so that under certain conditions—abrupt deceleration, for example—the seat tends to move in a forward direction. The instant invention provides that this movement of the seat relative to the floor shall be resisted or opposed by stretchable metal strips attached at one end to the seat and at their other end to the floor.

In the event of abrupt deceleration of the conveyance in which the seat is installed—for example, crash-landing of the aircraft—resulting in high forward deceleration of the aircraft, this deceleration results in a like deceleration of the occupants of the seat by the restraining force offered by the seat belts attached to the seat. This force, of course, tends to pivot and overturn the seat. In my improved construction such a movement is resisted by the stretchable steel strips. If the horizontal inertia force of the passengers being decelerated is great enough to result in a tension in the restraining strips equal to their combined yield strength, they will begin to stretch, permitting the seat structure to pivot, causing the center of mass of the passenger load to move forward with respect to the floor of the aircraft to which the seat is attached. So long as the seat is free to pivot, the total force exerted by the seat belts upon the passengers cannot exceed that necessary to cause further stretching of the strips. Thus it becomes apparent that, during this period, the deceleration of the seat occupants is limited to a certain value; also the loading upon the structural members of the seat is limited, as well as the load the seat imposes on the floor of the aircraft through the attachment of the seat to the floor. This is all regardless of the deceleration of the floor of the plane caused by the crash-landing. By way of example, if the strips yield when the forward deceleration of the passengers is 10 G, viz., about 322 feet per second per second, that is the amount they will be decelerated, even though the deceleration of the aircraft may be 15 G or 20 G or even higher. It will be apparent also that the structure of the seat and floor connections will not be subjected to higher forces than those representted by 10 G. Without this energy-absorption effect, a conventional rigid seat would have transmitted the violent deceleration to the seat occupants with injurious effect, or the seat or its floor attachments might have been broken loose, permitting the seat and its occupants to become free-flying objects with serious and possibly fatal results.

It will be appreciated that, for the most effective protection, the restraining force of the stretchable strips should be such that uniform deceleration is provided throughout the forward travel of the seat. The stretching of stainless steel, the metal I preferably employ, inherently requires an increasing force as elongation continues. I utilize this characteristic to obtain a substantially uniform deceleration of the load despite the increasing tension in the steel strips. This is accomplished by prestretching the strips to adjust the rate of increase of their restraint to the geometry of motion of the seat structure, so that substantially uniform deceleration of the seat is achieved.

I shall explain this feature of my invention in more detail in the description which follows, but, from the general description above set out, those skilled in this art will appreciate that my invention provides a construction in which means have been provided in the form of stretchable steel strips for yieldably opposing forward pivoting of a seat in the event of a sudden deceleration of the conveyance to which the seat is attached, so that the rate of deceleration of the seat occupants is kept within safe limits despite the fact that the rate of deceleration of the conveyance may be much higher.

In the accompanying drawings, wherein for purposes of clarity rather than by way of limitation I have illustrated an embodiment of my invention as applied to aircraft seats:

Fig. 1 is an isometric view showing my invention incorporated in a three-passenger seat for aircraft;

Fig. 2 is an elevational view, partially in section, of a leg frame and the corresponding upper frame structure of the seat of Fig. 1;

Fig. 3 is a fragmentary detail view illustrating one method of pivoting the forward ends of the energy-absorbing strips to the fore and aft stretchers of the leg frame; and Fig. 4 is an enlarged, fragmentary, part-sectional view of part of the rear leg assembly.

Referring to the drawings in detail, the seat illustrated comprises what may be termed three transversely spaced frame sections, namely, outboard section 3, inboard section 7, and intermediate section 5. It will be appreciated that each of these frame sections forms a basic structure to accommodate an individual passenger seat, the cushions C, backrest B, etc. of each individual seat being mounted thereon.

Lying along the front of the frame sections 3, 5, and 7 is a torque tube 2, this tube extending from one end to the other of the seat structure and passing through the fore and aft stretchers 4, to which it is secured by welding or in other suitable fashion.

6 designates a rear stretcher extending from one end to the other of the seat structure, parallel to the torque tube 2, this rear stretcher too passing through the fore and aft stretchers 4, to which it is secured by welding or in other suitable fashion.

Thus it will be seen that each pair of fore and aft stretchers 4, with the corresponding portion of the torque tube 2 and rear stretcher 6, forms a basic frame for the upper portion of an individual passenger seat.

Supporting this structure at an appropriate distance from the floor are two leg frames, transversely spaced from each other. Each of these leg frames comprises a rigid, triangular structure embodying a fore and aft stretcher 8, a front leg 10, and diagonal brace 12, along with a rear leg assembly 14, the rear leg assembly being pivoted to the triangular structure, as will be brought out later.

The leg frames are disposed transversely with respect to the upper seat structure as required by the configuration of the walls of the plane or other conveyance and the location of the floor tracks 16, to which they are secured.

They may or may not be symmetrically positioned with respect to the upper part of the seat structure.

The upper seat structure, comprising the torque tube 2, rear stretcher 6, and fore and aft stretchers 4, is secured to each leg frame by eye bolt 18, which passes through the torque tube and in turn is secured to fore and aft stretcher 8 of the leg frame by cap screw 20 and by a strap 22, which passes around the rear stretcher 6 and is secured to stretcher 8 by cap screw 24. Each leg frame is braced transversely by diagonal brace 26, extending from the front leg 10 to the torque tube 2.

Pivoted to the lower end of each of the front legs 10 is a foot 28, secured to the floor tracks 16 by studs 32, so that the legs may swing in the fore and aft vertical plane about pivot 30.

Fastened to each of the front feet 28 is a bottom fore and aft stretcher 34, extending rearwardly to the corresponding rear leg assembly 14, to which it is attached.

Each rear leg asesmbly, in the embodiment illustrated, comprises two telescoping members, namely, an outer female member 36 and an inner male member 38. Each female member 36 is provided at its lower end with a fitting 40, which is pivoted at 41 to a foot 42. Each foot 42 is secured to the floor track 16. At its upper end, each female member 36 is provided with an annular guide 44 for guiding the linear movement of the male member 38 of the leg assembly within the female member. The upper end of each male member 38 is provided with a fitting 46, pivotally attached, through strap 48 and pivot 50, to fore and aft stretcher 8. To limit the extent of movement of the male member 38 outwardly of the female member 36, a stop member 52 is secured to the lower end of the male member, this stop member engaging internal shoulder 54, with which the annular guide 44 is provided, on maximum outward movement of the male member with respect to the female member.

From the description thus far given it will be seen that the entire seat structure along with its occupants can pivot in an anti-clockwise direction about the pivotal connection 30 to impart a generally forward movement to the seat and its occupants. To yieldingly oppose such movement of the seat structure, each leg frame is equipped with energy absorbers in the form of stretchable stainless steel strips 56. In the drawings, a pair of these strips has been shown for each leg frame, but it is to be understood that one strip instead of a pair may be used, if desired. As seen from Fig. 3, the front end of each pair of strips is pivoted at 57 to the front end of fore and aft stretcher 8, while the rear end of each pair of strips is pivotally attached at 41 to the fitting 40 at the lower end of each rear leg assembly.

I have found that annealed stainless steel of the type frequently referred to as "18–8" or type 302 is well adapted for the energy-absorbing strips 56. This material contains about 18% chromium and about 8% nickel and allows great elongation or stretching before failure. Thin strips of this material may be stretched with an increasing resistance up to 60% and more of their original length. The stress at the initial yield point may be of the order of 40,000 to 60,000 pounds per square inch, which rises to somewhat over 100,000 pounds per square inch at failure, after elongation of over 60%. In thus stretching this material, it is quite apparent that an enormous amount of energy is absorbed in relation to its weight, which is of considerable advantage in aviation structures, for example, where weight is of primary consideration.

As previously pointed out, in the event of a crash-landing, for instance, if the horizontal inertia force of the seat occupants being decelerated is sufficiently great to result in a tension in the strips 56 equal to their combined yield strength, they will begin to stretch, permitting the seat structure to rotate about pivot 30, causing the center of mass of the passenger load to move forward with respect to the floor to which the seat is attached. As long as the seat is free to rotate about pivot 30, that is, until the stops 52 of the rear leg assemblies engage the stop shoulders 54 of the rear leg assembly guides 44, the total force exerted by the seat belts upon the seat occupants cannot exceed that necessary to cause further stretching of the strips 56. Hence, during this period deceleration of the seat occupants is limited to a certain value; also the loading upon the structural members of the seat is limited, as well as the load the seat imposes on the floor, regardless of the deceleration of the floor.

While the stainless steel strips inherently require an increasing force as elongation continues, so that deceleration of the load would not be uniform, I have discovered that, by prestretching the strips to adjust the rate of increase of their restraint to the geometry of motion of the seat structure, I can obtain substantially uniform deceleration.

In the configuration of the leg frame as illustrated in Fig. 2, it is found that, if the frame is rotated about pivot 30 until stopped by the limitation imposed by the stop mechanism—stop 52 and shoulder 54—of the rear leg assembly, pivot point 57 will have advanced to the broken-line position shown in Fig. 2. Due to the changed angle of the line of force between pivot points 57 and 41, I have found that, in order to maintain a constant restraining moment against rotation about pivot 30, the force applied along a line joining pivot 57 in its broken-line position and pivot 41 must be approximately 9% greater than that applied along a line joining pivot 57 in its solid-line position and pivot 41. In other words, the tension exerted by the strips 56 should be 9% greater upon being stretched to final position than it was initially, and in moving from initial to final position, the strips have been increased in length—stretched—approximately 12½%. If the strips 56 were used in their original condition, the force exerted to cause continuing yielding or stretching for 12½% elongation from the initial yield point would rise from 47,000 pounds per square inch to 75,000 pounds—an increase of 60%, and the restraining force exerted by them in the final elongated position would be 60% greater than at the start of motion, whereas, as above pointed out, an increase of only 9% is required to maintain the desired uniform restraining moment. The final restraining moment would, therefore, be in the order of 160 to 109 or 147% of that of the initial moment. Expressed in "G's," if the initial inertia load were 10 G, then the final load would have to be 14.7 G, a condition which could not be tolerated, assuming the initial load predicated on the strength of the supporting floor structure to be only 10 G.

To overcome this disadvantage, I employ the following novel procedure: I have found that the rate of change of increase of stress with increasing elongation falls off sharply as elongation proceeds. If I elect 45% elongation as the final elongation of the strips 56, it will be found that the stress is 99,000 pounds per square inch. Taking this as 109% of the initial stress required to maintain a uniform restraining moment, it is found that the initial stress must be 91,000 pounds per square inch, which is found at an elongation of 28%. Elongation between 28% and 45% is 17% of the initial length of the strips. Consequently, if the strips are stretched 28% before installation, the yield point of the stretched material will have been raised to 91,000 pounds per square inch, which is that required for initial motion of the frame. Thus it will be apparent that, when the prestretched strips are installed in the leg frames, they are in proper condition to give, upon further stretching by rotation of the frames about pivots 30, the necessary increase in restraining force to maintain the uniform moment desired. By this procedure, the actual initial length of the strips is so predetermined that the elongation of the installed strips, by reason of movement of the seat from initial to final position, is 17% of their initial length. It will be understood that this does not necessarily mean that the installed length of the strips will be the same as that above referred to where the elongation was stated as being 12½%, but the length of the installed, prestretched strips can be readily calculated.

From all of the foregoing it will be seen that my invention provides an energy absorber for yieldingly opposing relative movement between two elements, as, for example, pivotal movement of a seat relative to the floor to which it is secured.

It will be appreciated furthermore that the energy absorber takes the form of stretchable steel strips, which elongate—stretch—upon relative movement between the two objects, which in effect are united or coupled by the strips.

Still further it will be seen that strips are prestretched to a degree suitable to the particular configuration and requirements of the objects coupled by the strips, as, for example, an aircraft seat pivoted at the lower end of its front legs to the floor of the plane, whereby a substantially uniform movement is obtained.

It is to be understood that changes may be made in the details of construction and arrangement of parts hereinabove described without departing from the spirit and scope of my invention.

What I claim is:

1. In a seat for conveyances, a supporting structure for the seat comprising a pair of transversely spaced leg frames, each frame comprising a front leg, an elongatable rear leg, and a fore and aft stretcher extending from the upper end of the front leg to the upper end of the rear leg, the stretcher being rigid with the front leg and pivoted to the rear leg; means for pivotally attaching the lower end of each leg to the floor of the conveyance to permit of a generally forward movement of the center of mass of the seat and its occupant; and means for yieldably opposing such movement, said opposing means comprising a stretchable metal strip pivotally attached at one end to the leg frames adjacent the upper end of each front leg and pivotally attached at its other end to the rear leg at the pivotal attachment of the leg to the floor.

2. In a seat for conveyances, a supporting structure for the seat comprising a pair of transversely spaced leg frames, each frame comprising a front leg, an extensible rear leg, and a fore and aft stretcher extending from the upper end of the front leg to the upper end of the rear leg, the stretcher being rigid with the front leg and pivoted to the rear leg; means for pivotally attaching the lower end of each leg to the floor of the conveyance to permit of a generally forward movement of the center of mass of the seat and its occupant; and means for yieldably opposing such movement, said opposing means comprising a stretchable metal strip which has been prestretched to raise its initial yield point, said strip being pivotally attached to the leg frames adjacent the upper end of each front leg and extending diagonally to a point adjacent the lower end of each rear leg, where it is pivotally attached to the rear leg.

3. In a seat for conveyances, a supporting structure for the seat comprising a pair of transversely spaced leg frames, each frame comprising a front leg, a rear leg, and a fore and aft stretcher extending from the upper end of the front leg to the upper end of the rear leg, the stretcher being rigid with the front leg and pivoted to the rear leg; means for pivotally attaching the lower end of the front leg to the conveyance floor; the rear leg comprising two telescoping members, the lower of which is pivoted at its lower end to the conveyance floor; said construction providing for a generally forward movement of the center of mass of the seat and its occupant, the telescopic rear leg of each leg frame elongating on such movement; means within each rear leg to limit the extent of said elongation; and means for yieldably opposing the said generally forward movement of the center of mass of the seat and its occupant, said opposing means comprising a stretchable metal strip pivotally attached at one end to the leg frames adjacent the upper end of each front leg and pivotally attached at its other end to the rear leg at the pivotal attachment of the leg to the floor.

4. In combination, a seat for conveyances; means for pivotally securing the seat to the conveyance floor to permit of a generally forward movement relative to the conveyance of the center of mass of the seat and its occupant; a stretchable metal strip permanently prestretched to raise its yield point; and means for pivotally attaching the permanently prestretched strip to the conveyance and to the seat in position to be tensioned and further stretched upon said movement of the center of mass of the seat and its occupant, thereby yieldably to oppose said movement.

5. In combination, a seat for conveyances; means for pivotally securing the seat to the conveyance floor to permit of a generally forward movement relative to the conveyance of the center of mass of the seat and its occupant; a stretchable metal strip permanently prestretched to raise its yield point; and means for attaching the said prestretched strip to the conveyance and to the seat in position to be tensioned upon said movement of the center of mass of the seat and its occupant, thereby to oppose such movement, the extent of the said prestretching of the strip being such that the stress required further to stretch the strip is substantially equal to the stress required to initiate the said movement of the center of mass of the seat and its occupant.

6. In combination, a seat for conveyances; legs attached to the seat; means for pivotally attaching the legs to the conveyance floor, one of said legs being elongatable; means for pivotally attaching the elongatable leg to the seat, whereby the center of mass of the seat and its occupant is permitted a generally forward movement relative to the conveyance; and a stretchable metal strip, permanently prestretched to raise its yield point, attached to said seat and to the conveyance floor in position to be tensioned upon the said movement of the center of mass of the seat and its occupant, yieldably to oppose such movement.

7. In combination, a seat for conveyances; legs attached to the seat; means for pivotally attaching the legs to the conveyance floor, one of said legs being elongatable; means for pivotally attaching the elongatable leg to the seat, whereby the center of mass of the seat and its occupant is permitted a generally forward movement relative to the conveyance; and a stretchable metal strip, permanently prestretched to raise its yield point, attached to said seat and to the conveyance floor in position to be tensioned upon the said movement of the center of mass of the seat and its occupant, the extent of prestretch of the metal strip being such that the stress required for further stretching is substantially equal to that required to initiate the said forward movement of the center of mass of the seat and its occupant.

References Cited in the file of this patent

UNITED STATES PATENTS

| | | |
|---|---|---|
| 2,227,717 | Jones | Jan. 7, 1941 |
| 2,260,779 | Hoffman | Oct. 28, 1941 |
| 2,516,172 | Baldwin | July 25, 1950 |
| 2,521,203 | Cotton | Sept. 5, 1950 |
| 2,682,931 | Young | July 6, 1954 |
| 2,783,821 | Sherman | Mar. 5, 1957 |
| 2,853,257 | Cook | Sept. 23, 1958 |

OTHER REFERENCES

"The Making, Shaping and Treating of Steel," U.S. Steel Corp., seventh edition, pages 884 and 886.

Western Aviation Magazine, p. 18, May 1957.